Patented June 19, 1951

2,557,164

UNITED STATES PATENT OFFICE 2,557,164

METHOD OF ISOLATING QUERCITRIN FROM PEANUT HULLS

Simon H. Wender, Norman, Okla., assignor to the United States of America as represented by the administrator of the Federal Security Agency No Drawing. Application May 24, 1950,
Serial No. 164,025

2 Claims. (Cl. 260—210)

(Granted under the act of March 3, 1883, as amended April 30, 1928; 370 O. G. 757)

The invention described herein may be manufactured and used by or for the Government of the United States for governmental purposes without payment to me of any royalty thereon in accordance with the provisions of the act of April 30, 1928 (ch. 460, 45 Stat. L. 467).

This invention relates to the production of quercitrin.

Accordingly, it is an object of this invention to provide a process for the production of quercitrin from peanut hulls. Other objects and advantages will be apparent or will appear hereinafter.

These objects and advantages are accomplished in accordance with this invention by the method for the production of quercitrin from peanut hulls which comprises extracting the peanut hulls with a water-miscible organic solvent for quercitrin, concentrating the liquid extract in vacuo, forming a water suspension of the extracted materials by adding water to the concentrated liquid extract during further vacuum distillation of the concentrated extract until all the solvent has been removed, adding a demulsifying agent to the water suspension, extracting the water suspension with a water-immiscible organic solvent in which quercitrin is not appreciably solvent, crystallizing quercitrin from the extracted aqueous solution, and recovering said crystallized quercitrin.

For the purposes of this invention the peanut hulls may either be the hulls from roasted or unroasted peanuts.

Suitable solvents for the extraction of quercitrin from peanut hulls include the water-miscible organic solvents such as the lower alcohols, lower ketones, acetic acid, picolines, pyridine, and the like; hot water; and dilute mineral acids. The extraction can be more efficiently carried out at elevated temperatures not exceeding the boiling point of the solvent; therefore a presently preferred method of extracting the hulls involves refluxing the extraction mass using about 4 to 8 liters of solvent per kilo of hulls.

The concentration of the liquid extract is preferably carried out at reduced pressures. Vacuum conditions produced by aspirator suction have been found to be satisfactory for purposes of this invention, i. e., about 135 to 450 mm. Hg. The concentration is carried out until the volume of the liquid extract may be conveniently handled. At this point the solvent is entirely displaced with water to form a water suspension of the extracted materials. This can be accomplished by continuing the vacuum concentration by continuously replacing the solvent removed with water.

Since the water suspension could readily form emulsions in following the steps, it is presently preferred to add a demulsifying agent before proceeding. Suitable demulsifying agents for the purposes of this invention include salts of the alkali metals such as the chlorides, nitrates, sulfates, and the like; sodium chloride for reasons of economy being presently preferred; however, any demulsifier which will prevent the emulsification of the soluble constituents of the peanut hulls may be employed.

Suitable water-immiscible organic solvents in which quercitrin is not appreciably soluble which can be employed for the purposes of this invention in the step of extracting the water suspension of the extracted material include: benzene, toluene, xylenes, alkanes ($C_5$ and higher), cyclohexane, and the like. This extraction step is preferably carried out using a plurality of portions of the solvent and is continued until the solvent layer is colorless.

While crystallization of the quercitrin from the water phase will occur at room temperatures, it will be hastened at lower temperatures and also by seeding with quercitrin. The crystallized product may be separated and recovered by any of the well known methods. Generally it is desired to purify the crude quercitrin recovered by this procedure. This may be done by recrystallization procedures.

The following examples will show with greater particularity how the invention may be carried out; however, the invention is not to be construed as limited thereto.

Example I

The peanut hulls were extracted with boiling ethanol, using 4 liters of ethanol per kilogram of the shells. Seventy-eight degrees (centigrade) was the maximum temperature attained in this step. The alcoholic extract was concentrated (to about 200 to 700 ml.) in vacuo, the temperature never exceeding 60° C. Water was added in order to maintain a convenient volume in a 1 liter flask (300–400 cc.) until all the alcohol has been removed. The temperature in the concentration flask was never allowed to exceed 70° C. after water had become the solvent in excess.

The water suspension (700 ml.) was extracted with benzene until the benzene layer was colorless. This usually required 10 portions of the benzene of 25 cc. each. Approximately ½ gram of sodium chloride was added during this extraction to prevent the formation of emulsions.

The extracted solution was placed in the refrigerator and a precipitate (crude quercitrin)

separated on standing overnight. The precipitate was separated from the supernatant liquid by centrifugation.

Recrystallization of the crude quercitrin was accomplished as follows: One to two cc. of ethanol was added to the precipitate and the ethanol brought to a boil (78° C.), at which time the crude product went into solution. Water was added dropwise to incipient cloudiness. This cloudy solution was placed in the refrigerator until crystallization was complete. The product is air dried.

*Example II*

The procedure in this method was the same as in Example I up to the concentration step. In this step the alcoholic extract was taken to a volume of 300-400 cc. in vacuo and no water was added. The concentrate was then placed in a vessel in which "swirling" was possible (Erlenmeyer flask). Water was added dropwise with "swirling" until the precipitation of the brown, resinous material was complete. As the brown substance was precipitated it adhered to the walls of the flask. The supernatant liquid was decanted (total volume of the supernatant was 400-500 cc. at this point). Water was added to the decanted solution to an extent of 1½ volumes and the solution placed in the refrigerator for crystallization.

*Example III*

The hulls were extracted exhaustively with boiling water, using approximately 10 liters of water per kilogram of hulls. The extract was filtered and dialyzed against water. The volume of the dialyzate was roughly 10 times the volume of the original extract. The dialyzate was concentrated in a flash type evaporator to one-half the volume of the original extract and set aside for crystallization. Recrystallization was carried out as in the previous two methods.

From the foregoing description and examples it will be apparent that methods for the production of quercitrin have been presented.

Since many widely differing embodiments of the invention will occur to one skilled in the art, the invention is not to be construed as limited to the specific details illustrated and described and various changes can be made therein without departing from the spirit and scope thereof.

What is claimed is:

1. The method for the production of quercitrin from peanut hulls which comprises extracting the peanut hulls with a water-miscible organic solvent for quercitrin, concentrating the liquid extract in vacuo, forming a water suspension of the extracted materials by adding water to the concentrated extract during further vacuum distillation of the concentrated extract until all the solvent has been removed, adding a demulsifying agent to said water suspension, extracting the water suspension of the extracted materials with a water-immiscible organic solvent in which quercitrin is not appreciably soluble, crystallizing quercitrin from the extracted aqueous solution, and recovering said crystallized quercitrin.

2. The method for the production of quercitrin from peanut hulls which comprises extracting peanut hulls with ethanol at temperatures not exceeding the boiling point of the alcohol, concentrating the alcoholic extract in vacuo, forming a water suspension of the extracted materials by adding water to the concentrated extract during further vacuum distillation until substantially all the alcohol has been removed, adding a minor amount of sodium chloride to the water suspension, crystallizing quercitrin from the extracted aqueous solution, and recovering said crystallized quercitrin.

SIMON H. WENDER.

REFERENCES CITED

The following references are of record in the file of this patent:

UNITED STATES PATENTS

| Number | Name | Date |
|---|---|---|
| 2,534,250 | De Eds et al. | Dec. 19, 1950 |

OTHER REFERENCES

Rec. Trav. Chim 40 (1921), pages 708-710; 3 pages.

Drug and Cosmetic Ind., V. 60 (1947), pages 174, 175, 267.